(12) United States Patent
Janssen et al.

(10) Patent No.: US 7,519,076 B2
(45) Date of Patent: Apr. 14, 2009

(54) METHOD AND NODE FOR USING A COMMUNICATION NETWORK IN PARALLEL FOR REAL-TIME APPLICATIONS AND NON-REAL-TIME APPLICATIONS

(75) Inventors: Dirk Janssen, Verl (DE); Hans Beckhoff, Verl (DE)

(73) Assignee: Elektro Beckhoff GmbH, Veri (DE)

( * ) Notice: Subject to any disclaimer, the term of this patent is extended or adjusted under 35 U.S.C. 154(b) by 437 days.

(21) Appl. No.: 10/532,159

(22) PCT Filed: Oct. 22, 2003

(86) PCT No.: PCT/EP03/11705

§ 371 (c)(1),
(2), (4) Date: Sep. 8, 2005

(87) PCT Pub. No.: WO2004/039012

PCT Pub. Date: May 6, 2004

(65) Prior Publication Data

US 2006/0109866 A1    May 25, 2006

(30) Foreign Application Priority Data

Oct. 25, 2002    (DE) ................................ 102 49 851

(51) Int. Cl.
*H04L 12/413*    (2006.01)
(52) U.S. Cl. .................... 370/445; 370/468; 370/493
(58) Field of Classification Search ................ 370/493, 370/468, 474, 476, 352, 445, 353
See application file for complete search history.

(56) References Cited

U.S. PATENT DOCUMENTS

| 5,430,843 A | 7/1995 | Sato et al. |
| 5,654,969 A | 8/1997 | Wilhelmsson |
| 6,356,559 B1 * | 3/2002 | Doucette et al. ............ 370/450 |

(Continued)

FOREIGN PATENT DOCUMENTS

EP    1 111 846 A1    6/2001

(Continued)

OTHER PUBLICATIONS

Article: Sharrock S.M. et al: "A CSMA/CD-Based, Integrated Voice/Data Protocol With Dynamic Channel Allocation" Computer Networks and ISDN Systems, North Holland Publishing. Amsterdam, NL, Bd. 18, Nr. 1, (Nov. 24, 1989), Seiten 1-18, XP000070488, ISSN: 0169-7552, Seite 3, rechte Spalte, Absatz 2-Seite 5, linke Spalte, Absatz 4, Seite 6, linke Spalte, Absatze 1,2.

(Continued)

*Primary Examiner*—Min Jung
(74) *Attorney, Agent, or Firm*—Faegre & Benson LLP (57) ABSTRACT

The invention concerns a data transmission technique for real-time applications and non real-time applications in a communication network comprising several nodes connected by communication channels. The invention is characterized in that the data are cyclically and deterministically transmitted, the data for the real-time applications being processed in priority, such that, during one transmission cycle, all the data for the real-time applications are first sent, then, in the time interval remaining prior to the next transmission cycle, the data for non real-time applications are sent.

13 Claims, 3 Drawing Sheets

U.S. PATENT DOCUMENTS

| | | | |
|---|---|---|---|
| 6,483,846 B1* | 11/2002 | Huang et al. | 370/445 |
| 6,574,242 B1* | 6/2003 | Keenan et al. | 370/474 |
| 6,990,079 B2* | 1/2006 | Vrabel | 370/252 |
| 7,080,012 B2* | 7/2006 | Latimer, Jr. | 704/270 |
| 7,106,744 B2* | 9/2006 | Gummalla et al. | 370/395.4 |
| 2005/0041690 A1* | 2/2005 | Arnold et al. | 370/493 |
| 2005/0286559 A1* | 12/2005 | Miernik et al. | 370/468 |

FOREIGN PATENT DOCUMENTS

| | | |
|---|---|---|
| WO | WO 00/03521 | 1/2000 |

OTHER PUBLICATIONS

Article: Bertoluzzo M. et al: "Ethernet Networks for Factory Automation" Proceedings of the 2002 IEEE International Symposium on Industrial Electronics, Bd. 1, (Jul. 8, 2002), Seiten 175-180, XP010598166, Seite 178, rechte Spalte-Seite 179, linke Spalte, Abbildung 7.

Demartini C. et al: Real-Time Communication in the Factory Automation Signal Processing and Systems Control, Intelligent Sensors and Instrumentation. San Diego, Nov. 9-13, 1992, Proceedings of the International Conference on Industrial Electronics, Control, Instrumentation and Automation (IECON), New York, IEEE, US, Bd. 3 Conf. 18, (Nov. 9, 1992), Seiten 772-777, XP010060623, ISBN: 0-7803-0582-5 das ganze Dokument.

* cited by examiner

METHOD AND NODE FOR USING A COMMUNICATION NETWORK IN PARALLEL FOR REAL-TIME APPLICATIONS AND NON-REAL-TIME APPLICATIONS

This application is the national phase under 35 U.S.C. § 371 of PCT International Application No. PCT/EP2003/011705, which has an international filing date of Oct. 22, 2003 and which designated the United States of America.

Ethernet is the most widely disseminated technology with which data can be transferred in local data communications networks known as local area networks (LAN), currently at a speed of up to 100 million bits/sec (Mbps). LANs are local communications networks that are limited to one geographical area and are composed of one or more servers and workstations, known as nodes, which are connected via a communications line network such as a coaxial, fiber-optic or twisted pair cable. A great variety of network topologies are possible for LANs, with bus, ring, star or tree structures being the most widely known.

LANs are operated with a network operating system and a uniform network protocol. Ethernet represents one possible network protocol and supports a wide variety of communications protocols such as the TCP/IP protocol or the IPX protocol. In the OSI layer model, the international reference model for data transfer in networks, which is constructed of a layer stack of seven layers, with a number of protocols defined for each layer, each providing their services to the next higher layer, Ethernet is assigned to the second layer, the so-called data link layer. In this line layer, the data to be transferred is bundled into packets to which specific information for the respective communications protocol is added. The data link layer is responsible in the network for transporting the packets from node to node and for error detection. In the Ethernet concept, the data link layer is subdivided into two planes, with the first plane adding an initial section, known as a header, which contains information that is needed by the receiver protocol for proper data transfer. In the second plane of the Ethernet protocol, the data packet is then encapsulated with the aid of an additional header and another end section, known as a trailer, for the transport of data packets from node to node. With such Ethernet data packets, known as Ethernet telegrams, data with a length of up to 1500 bytes can be transferred.

Ethernet protocols are predominantly employed in office communications networks. Because of the advantages of the Ethernet concept in the usage of standard hardware and software components, as well as the possibility of achieving high data-transfer rates with a simple network topology, there is the desire to employ the Ethernet protocol for data exchange between workstations in industrial production as well. Particularly the deficient real-time capability of the Ethernet protocol, however, allows only limited usage in automation technology. In controlling machines, it is necessary that there be a cyclical processing of the control task without fluctuations, i.e., with only slight deviations from the desired cycle time in the range of a few microseconds, with a reaction to the control request in a predictable response time.

Real-time capability and fast reaction time as required in automation technology have only a subordinate importance, however, in the standard data-processing applications for which Ethernet communication is usually employed. It is true that Ethernet communications methods are known for real-time transfer of data for video and audio data transmission. The requirements on reaction times are not very critical for such applications, however, because small fluctuations can readily be compensated for with suitable data buffers in the workstations. In bidirectional communication as well, for instance in Internet telephony or online gaming, real-time capability and reaction time play only a minor role.

In order to make the applications mentioned above possible in the context of Ethernet communications, methods have been developed to prioritize individual Ethernet frames. Two methods are primarily used in this regard. In order to achieve a certain real-time capability with short reaction times, the Ethernet data telegrams to be transmitted are classified into various priority categories, with the data packets having the highest priority being sent first. Alternatively, methods are used in which the priority of the data is added to the Ethernet data packet itself in the form of additional information. Based on this additional information, later nodes in the network can then detect those data packets that have been given a higher priority and give them preferred processing.

The two Ethernet methods above, however, do not meet the higher requirements for real-time capability, i.e., the processing of data synchronously with its generation without detectable delay, and reaction times that are necessary in automation technology. In particular, there is the problem that, even with an optimal assignment of priorities to the Ethernet data packets, a lower-priority Ethernet telegram currently being transmitted is still transmitted in full when a new, higher-priority data packet arrives. The newly arriving, high-priority packet is then delayed by the transmission time of the lower-priority data packet, thus up to about 1500 bytes for an Ethernet data packet. This can lead to a time delay of up to about 150 μsec, so that the requirements of hard real-time applications with cycle times of around 50 μsec and reaction times of at most 10 μsec cannot be met.

The problem of the invention is to provide a method for operating a local communications network and an interface unit for linking a node to such a local communications network with which real-time and non-real-time applications can be run in parallel in a simple manner.

WO 00/03521 discloses a real-time implementation in an Ethernet, in which the controller ensures that real-time data is transmitted before non-real-time data. SHARROCK, S.M. ET AL.: "A CSMA/CD-BASED, INTEGRATED VOICE/DATA PROTOCOL WITH DYNAMIC CHANNEL ALLOCATION," COMPUTER NETWORKS AND ISDN SYSTEMS, NORTH HOLLAND PUBLISHING, AMSTERDAM, NL, Vol. 18, No. 1, Nov. 24, 1998, pp. 1-18, describes a transmission method in which voice data and normal data are separated in an Ethernet application. In this case, the voice data has priority over the normal data. U.S. Pat. No. 5,654,969 discloses the option of designing a transmission cycle such that it is possible to distinguish between two data types, one data type having transmission priority. EP-A-1 111 846 describes a real-time system in which real-time data is transmitted first in a transmission cycle, and then other data is transmitted.

This problem is solved by a method and a node according to the recited claims. Preferred refinements are specified in the dependent claims.

According to the invention, data transfer is performed cyclically and deterministically in a communications network with several nodes that are connected to one another by way of a communications link, with data for real-time applications being handled on a prioritized basis, so that all data for real-time applications is passed on first in a transmission cycle and, in the time remaining until the next transmission cycle, data for non-real-time applications is then transmitted.

The data transmission method according to the invention for a local area network permits parallel usage of the communications network for real-time and non-real-time applications. In particular, it is assured that the protocols according to the invention for local area networks, which represent the data link layer in the OSI model, also satisfy the requirements of real-time capability and reaction time for machine control tasks. In order to meet the communications requirements of a real-time system, data transmission is done under complete control of the real-time system, with real-time data communication being prioritized over the remaining data communication, e.g., for error diagnosis, which is initiated by the operating system of the node. All data for non-real-time applications is treated on principle as being lower-priority and is transmitted only when data transmission for real-time data packets has already terminated. With the aid of the prioritization technique of the invention for real-time data with simultaneous performance of a cyclical and deterministic data transmission, it is assured that non-real-time capable accesses are executed only after real-time capable accesses and thus do not obstruct real-time data traffic.

According to a preferred embodiment, a transmission process is carried out in such a manner that the data for real-time applications is first transmitted in a transmission cycle, and then the time remaining until the next transmission cycle is calculated so that the remaining time can be used for data transmission for non-real-time applications. In that way it is assured that data packets from the real-time system always finds a free transmission line when their turn comes. Data packets for non-real-time applications such as the operating system are sent only thereafter, in the gaps between two transmission cycles, if the appropriate amount of time remains. It is preferred to transmit the data in packets such that, if the time remaining after transmitting the data for real-time applications exceeds the time span required for transmitting a data packet for non-real-time applications, the data packet in question is interim-stored and preferably set with the next transmission cycle. This procedure permits simple priority control of the transmitting operation of real-time applications and non-real-time applications.

According to an additional preferred embodiment, the data received in a reception cycle is analyzed in a transmission process in order to determine which of the received data is data for real-time applications and which is data for non-real-time applications, with the received data for real-time applications being processed in the ensuing reception cycle. This procedure makes it possible to filter out all real-time relevant data packets without regard to when or in what order they arrive. In that way it is assured that real-time relevant information is available in complete form for the real-time applications to be run.

It is additionally preferred to process the filtered-out received data for non-real-time applications in a process independent of the real-time applications. The passing of data packets with data that is not real-time relevant to the operating system outside of the real-time context permits a high data transfer rate with simultaneous simple implementation of the reception process.

According to another preferred embodiment, transmission, reception and processing for the data of the real-time applications and the data of the non-real-time applications are executed in parallel, with the received data being evaluated in a first step for processing the data, the real-time applications being run with the detected real-time data in a second step, and with the real-time data to be transmitted being turned over in a third step. This procedure permits high transmission performance with complete real-time capability and thus guarantees the communications requirement for fast machine control. It is preferred in this case to design the transmission and reception cycle in full duplex operation such that the cycle period is fixed, but the transmission cycle is delayed by a constant time span with respect to the reception cycle corresponding to the first and second processing steps in which the data is analyzed and the real-time applications are run. This procedure assures simple and fast full duplex operation with trouble-free real-time communication.

The invention will be explained further on the basis of the appended drawings. Shown are.

With a communications network, it is possible in a simple manner to exchange data and resources between workstations, generally computers or machines, also called nodes below, and to use them jointly. The Ethernet concept is the most widespread communications standard in local area networks (LAN). Ethernet is based on a LAN structure in which a plurality of nodes are connected to one another via a shared transmission medium, the Ethernet concept taking on the encapsulation of the data to be transmitted in data packets, referred to as data telegrams below, with a predetermined format. Ethernet consists of three domains, namely, the transmission medium and the network interfaces, i.e., the hardware, the set of protocols that control access to the transmission medium, and the Ethernet packet format. Ethernet fundamentally represents a bus network, in which arbitrary bus topologies can be used, as shown in FIG. 1.

Figure 1A:
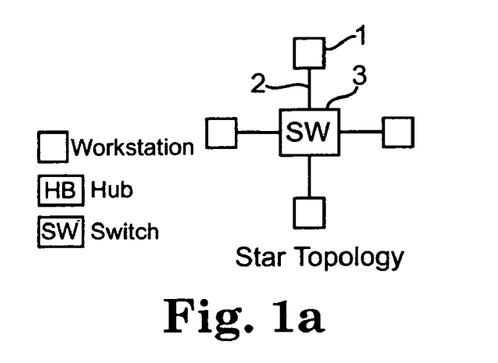
FIG. 1, possible network topologies for a local area network.
Figure 1B:
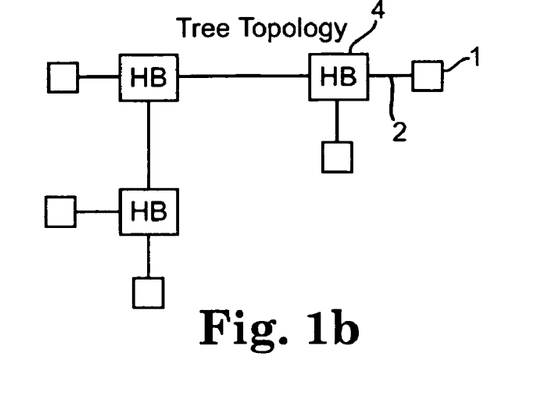
Figure 1C:
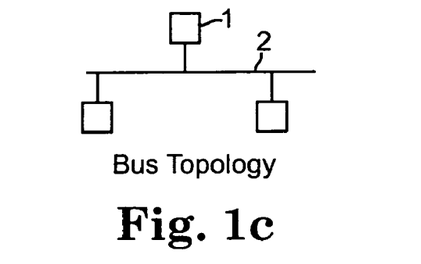

FIG. 1a shows another additional network topology for an Ethernet. Here the nodes 1 are connected via point-to-point connections 2 to a central switching station 3, known as a switcher. FIG. 1b represents a bus system as a possible network topology. Here all nodes 1 are connected to one another via a transmission line 2. FIG. 1c represents another Ethernet network topology in the from of a tree network, which is a combination of the network systems above, which are connected by way of switching centers 4, known as hubs, inserted between the network systems.

Figure 2:
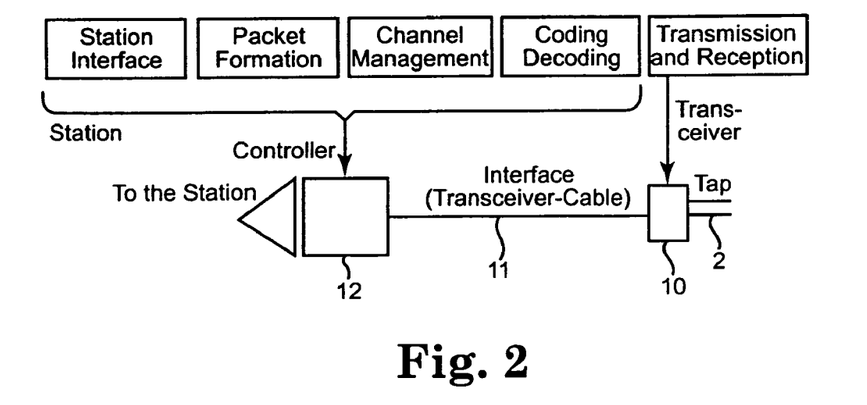
FIG. 2, a possible connection of a node to a network.

FIG. 2 shows a possible connection of a node 1 in a network topology with point-to-point connections. In Ethernet the access to the transmission medium 2 is generally accomplished by way of a coupler unit 10, known as a transceiver, which is generally placed directly on a network adapter card together with an Ethernet controller 12. Ethernet coupler 10 is connected via an interface 11 and Ethernet controller 12. Alternatively, the Ethernet controller can also be integrated into the Ethernet controller. The Ethernet controller performs the encoding of the data to be transmitted and the decoding of the received data. All control measures necessary for the operation of the Ethernet are also managed by Ethernet controller 12, i.e., the Ethernet controller carries out the management and the encapsulation of the data. Alongside this link management, the Ethernet controller 12 also serves as the interface to the data station, the node, in which the data is then further processed.

Ethernet data transmission usually takes place with the aid of network protocol such that data transmission is only carried out if the network is calm. In addition, a collision avoidance mechanism is provided. An Ethernet packet can contain about 1500 bytes, the data being encapsulated by means of header and trailer information that indicates the initial label, the target and source address, the type of data packet and the mechanism for error recognition.

The operating systems of the nodes involved in the network communication generally have a stratified software structure in order to separate protocol-specific processing from telegram-specific and hardware-specific processing. It is thereby possible to use different communications protocols for the Ethernet standard without having to make modifications to the hardware-specific driver in each case. At the same time, there is also the possibility of modifying the hardware within the Ethernet standard without having to make protocol-specific modification to the software. The communications protocol used can determine the Ethernet controller at which an Ethernet telegram is sent. The telegrams received by the Ethernet controller are in turn made available to all protocols of the operating system in the node, with the protocols deciding whether they then process the telegram.

Figure 3:
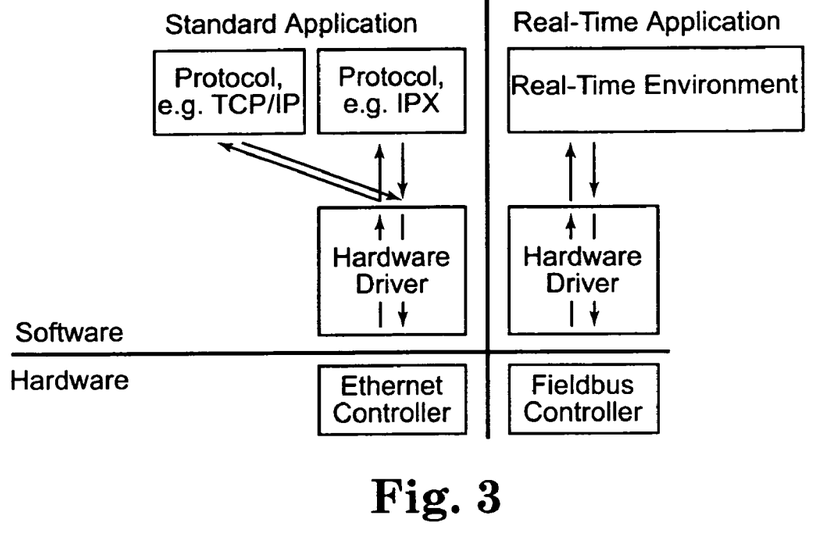
FIG. 3, a conventional design of a network system with a separate Ethernet controller for non-real-time applications and a field bus system for real-time applications.

Ethernet has established itself particularly as the communications standard for network systems in office communications, since standard hardware components and standard software components can be used and high data transfer rates are possible. For this reason, it is also desirable to be able to use the Ethernet standard in an industrial environment. The essential problem in this regard is the insufficient real-time capability, so that for automation tasks the network systems for carrying out communication tasks that are not time-critical and the real-time applications for machine control are conventionally separated, as shown in FIG. 3. For real-time applications, communications networks with independent controller subassemblies, known as field bus controllers, are generally provided in the workstations in order to be able to carry out time-critical control tasks. With such field bus systems for real-time applications, it has conventionally been possible to achieve cycle times of 50 μs for machine control with acceptable jitter times, i.e., deviations of 10 μs from the desired cycle time.

Figure 4:
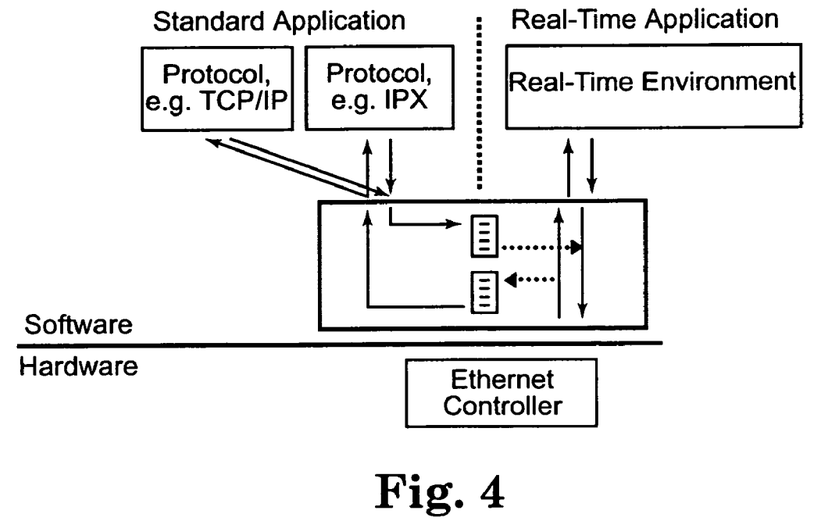
FIG. 4, a driver according to the invention for parallel running of real-time applications and non-real-time applications on an Ethernet controller.

To also be able to use local area networks for non-time-critical standard applications, especially those conforming to the Ethernet standard, as a genuinely real-time capable data transfer network for carrying out control tasks, the hardware-specific and/or software-specific driver of conventional Ethernet controllers is replaced by an Ethernet driver according to the invention that has been enhanced for real-time operation, as shown in FIG. 4. This Ethernet controller according to the invention enables the parallel usage of the communications network for transmitting data for real-time applications and data for non-real-time applications. The data transmission is performed cyclically and deterministically, the data for real-time applications being treated with priority, so that in a transmission cycle all real-time data is first transferred and, in the time that remains until the next transmission cycle, the data for non-real-time applications is transferred. All the data, collected in the form of telegrams, for non-real-time applications, particularly those generated by the operating system of the node assigned to the Ethernet controller, is treated as having lower priority and is subordinated to the real-time system. The Ethernet controller according to the invention communicates with the real-time system and is responsible for the real-time capable transmission and reception of the Ethernet telegrams. To allow the parallel running of standard applications, the Ethernet controller according to the invention reports itself to the operating system of the node as a standard Ethernet driver, to which in principle all communications protocols of the operating system are available. All data of the operating system is handled by the Ethernet controller of the invention with lower priority and sent only after a check by the real-time system. All received real-time telegrams are assessed by the real-time system and then passed on to the operating system if appropriate.

The Ethernet controller according to the invention is thus completely under the control of the real-time system, so that non-real-time accesses are prevented or shifted to non-real-time critical time sections. The prioritized transmission of real-time and standard telegrams is also done in the manner shown in FIG. 5. In the transmission process, it is assured in a transmission cycle with the aid of the Ethernet controller according to the invention that the data for the real-time application is transmitted completely, and only then is the data for the non-real-time application transferred. This cyclical and deterministic transmission process assures that pending real-time telegrams are transmitted without delay. Simultaneously, the length of the pending real-time telegrams is added up to determine the transmission period for a known data rate. After all real-time telegrams have been transmitted the time that remains until the transmission cycle is calculated. In this remaining time, the available telegrams with non-real-time applications [sic; data] which are to be transmitted by the operating system and are stored in a buffer, preferably a FIFO queue, are transmitted. The transmission period required for transmitting these data telegrams with non non-real-time applications is again taken into consideration. If a telegram with non-real-time data cannot be transmitted in the time remaining until the next transmission cycle, then it remains in FIFO storage and is transmitted only after the transmission of the real-time telegrams in the next transmission cycle.

Figure 5:
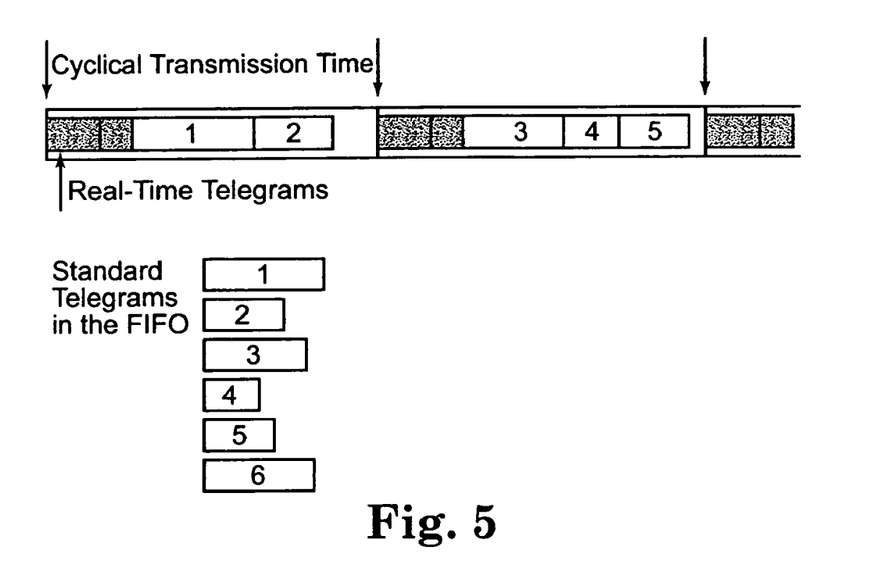
FIG. 5, a transmission process according to the invention for real-time data packets and non-real-time data packets.

In the transmission process, the data received in a reception cycle is analyzed with the aid of the Ethernet controller to determine which of the data received is data for real-time applications and which of the data received is data for non-real-time applications, with the received data for real-time applications then being processed at the start of the next real-time [cycle]. The data for non-real-time applications, on the other hand, is processed in a process independent of the real-time application.

The preferred procedure here is that the received Ethernet telegrams are stored in the order of reception by the Ethernet controller according to the invention, preferably in the node's memory. The Ethernet controller is set such that it does not initiate any interrupts during reception, so that all received telegrams are processed only at the start of the next real-time cycle. In this process, the real-time system goes through all received telegrams and then analyzes the telegrams relevant to the real-time system. All received real-time relevant data is thus available at the start of the real-time cycle. All telegrams with data of no real-time relevance, on the other hand, are marked as read and passed on to the operating system outside the real-time context. In a process independent of the real-time application, the list of marked received telegrams can then be processed by the operating system and its protocols. The real-time telegrams processed by the real-time system, however, are not passed on to the operating system as a rule. Such a transfer is done only for debugging purposes.

Figure 6:
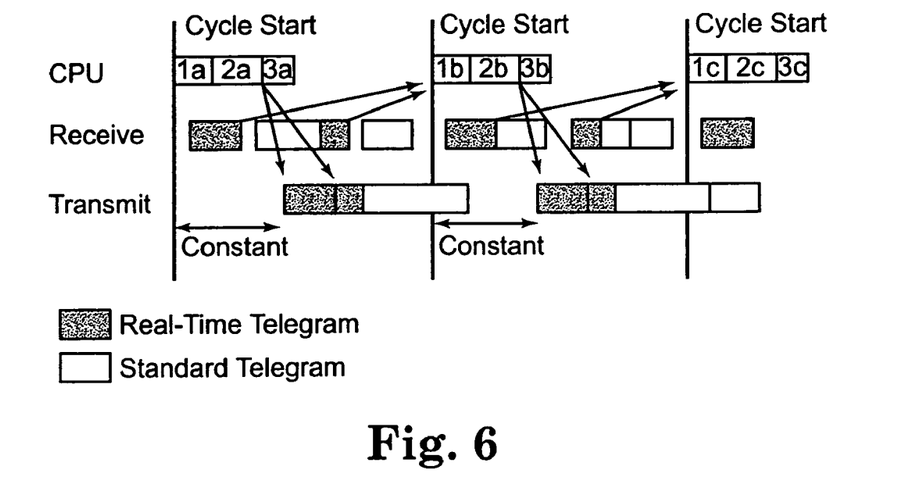
FIG. 6, a full duplex operation according to the invention for parallel transmission, reception and processing of real-time and non-real-time data packets.

Moreover, it is preferable, for use of Ethernet, for real-time and non-real-time applications to be performed in full duplex mode, i.e., with the possibility of a parallel transmission, reception and processing of data for real-time applications and non-real-time applications. A full-duplex operation according to the invention is shown in FIG. 6. Several successive real-time cycles are shown there, with the time sequence of the processing by the central processing unit (CPU) in the node being illustrated for each, as well as the sequence of transmission and reception processes of real-time telegrams and standard telegrams with non-real-time data. In step 1, the received telegrams from the previous transmission cycle are analyzed at the start of each real-time cycle. In step 2, the actual automation task is performed in real time on the basis of the analyzed real-time data. In step 3, the pending real-time telegrams are turned over to the Ethernet controller by the central processing unit. Here the real-time relevant telegrams are always transmitted immediately and then—if present and if sufficient time remains—the telegrams with operating system data that is not real-time relevant. The transmission process is always delayed relative to the beginning of a real-time cycle by a fixed time span that corresponds to he time period for the first and second processing steps of the CPU. The reception process, on the other hand, is preferably started simultaneously with or shortly after the start of the real-time cycle.

By virtue of the expansion of the Ethernet concept according to the invention, it is possible to use local networks in parallel for standard applications and real-time applications.

The invention claimed is:

1. A method for transmitting data for real-time applications and non-real-time applications in a communications network with several nodes that are connected to one another via a communication path,
   wherein the data transmission between the nodes takes place in a cyclic and deterministic fashion and data for real-time applications has priority over other data such that all data for real-time applications is transmitted first during a transmission operation and data for non-real-time applications is subsequently transmitted in the time that remains until the next transmission operation starts, the method comprising the steps of:
   at least one node receiving, processing and sending data for real-time applications in parallel during a real-time cycle by:
   executing a first processing step, wherein data received in a previous real-time cycle from another node via the communication path is analyzed to determine which received data are intended for real-time applications and which received data are intended for non-real-time applications;
   executing a second processing step, wherein real-time applications are executed; and
   executing a third processing step, wherein data for real-time applications to be transmitted to another node is sent via the communication path.

2. The method according to claim 1, wherein, in the third processing step, the data for real-time applications is completely sent during the transmission operation, and wherein the third processing step further comprises calculating the time remaining until the next transmission operation starts, in order to subsequently send data for non-real-time applications in the remaining time.

3. The method according to claim 2, wherein the data is transmitted in the form of data packets and wherein, when the time remaining after the sending of data for real-time applications exceeds the transmission time required to send a data packet for non-real-time applications, the third processing step further comprises storing the data packet for non-real-time applications in the interim and sending the stored data packet preferentially during the next transmission operation.

4. The method according to claim 3, wherein the data for non-real-time applications is processed independently of the data for real-time applications.

5. The method according to claim 1, wherein the data for non-real-time applications is processed independently of the data for real-time applications.

6. The method according to claim 1, wherein the duration of the transmission operation and a reception operation corresponds to that of the real-time cycle, and wherein the transmission operation is delayed relative to the reception operation by a constant period of time that corresponds to the period of time for the first and the second processing steps.

7. The method according to claim 6, wherein the reception operation is started simultaneously with or shortly after the start of the real-time cycle.

8. A node configured to carry out a parallel transmission, reception and processing of data for real-time applications and data for non-real-time applications, the node comprising:
   an interface unit connecting the node to a communications network including several nodes connected to one another via a communications path, the interface unit configured to cyclically and deterministically transmit data between the node and the communications network in order to handle data for real-time applications with priority over data for non-real-time applications, such that all data for real-time applications is transmitted first during a transmission operation and data for non-real-time applications is subsequently transmitted in the time that remains until the next transmission operation starts; and
   a processing unit (CPU) operatively coupled to the interface unit, wherein in a real-time cycle, the processing unit:
     evaluates data received from another node via the communication path in the respectively preceding real-time cycle in a first processing step of the real-time cycle in order to determine received data intended for real-time applications and received data intended for non-real-time applications;
     executes real-time applications in a second processing step; and
     transfers data for real-time applications to be transmitted to another node to the interface unit in a third processing step.

9. The node according to claim 8, wherein the interface unit completely sends the data for real-time applications during the transmission operation and calculates the time remaining until the next transmission operation in order to send data from non-real-time applications in the remaining time.

10. The node according to claim 9, wherein the data is transmitted in the form of data packets, and wherein the interface unit includes a buffer that stores a data packet for non-real-time applications in the interim if the time remaining after the sending of data for real-time applications is exceeded by the transmission time required to send the data packet for non-real-time applications, with the stored data packet preferentially sent during the next transmission operation.

11. The node according to claim 10, wherein the processing unit processes the received data for real-time applications and the received data for non-real-time applications independently of one another.

12. The node according to claim 8, wherein the processing unit processes the received data for real-time applications and the received data for non-real-time applications independently of one another.

13. The node according to claim 8, wherein the data is transmitted in the form of data packets, and wherein the interface unit includes a buffer that stores a data packet for non-real-time applications in the interim if the time remaining after the sending of data for real-time applications is exceeded by the transmission time required to send the data packet for non-real-time applications, with the stored data packet preferentially sent during the next transmission operation.

\* \* \* \* \*

UNITED STATES PATENT AND TRADEMARK OFFICE
CERTIFICATE OF CORRECTION

PATENT NO. : 7,519,076 B2
APPLICATION NO. : 10/532159
DATED : April 14, 2009
INVENTOR(S) : Dirk Janssen et al.

It is certified that error appears in the above-identified patent and that said Letters Patent is hereby corrected as shown below:

On the title page:

Paragraph (73) Assignee: should read --Beckhoff Automation GmbH, Verl, (DE)--

The application number of the Foreign Application Priority Data in Paragraph (30) should read --102 49 851.2--

Signed and Sealed this

Eighth Day of December, 2009

David J. Kappos
*Director of the United States Patent and Trademark Office*